US007310604B1

(12) United States Patent
Cascone et al.

(10) Patent No.: US 7,310,604 B1
(45) Date of Patent: Dec. 18, 2007

(54) STATISTICAL SOUND EVENT MODELING SYSTEM AND METHODS

(75) Inventors: Kim Cascone, Pacifica, CA (US); Sean M. Costello, Seattle, WA (US); Nicholas J. Porcaro, San Francisco, CA (US); Timothy S. Stilson, Mountain View, CA (US); Scott A. Van Duyne, Palo Alto, CA (US)

(73) Assignee: Analog Devices, Inc., Norwood, MA (US)

( * ) Notice: Subject to any disclaimer, the term of this patent is extended or adjusted under 35 U.S.C. 154(b) by 911 days.

(21) Appl. No.: 10/040,653

(22) Filed: Oct. 19, 2001

Related U.S. Application Data

(60) Provisional application No. 60/242,808, filed on Oct. 23, 2000.

(51) Int. Cl.
*G10K 15/04* (2006.01)
*G06F 7/58* (2006.01)

(52) U.S. Cl. ....................... 704/272; 704/278; 708/250

(58) Field of Classification Search ................ 704/258, 704/266, 267, 270, 278, 272; 708/250
See application file for complete search history.

(56) References Cited

U.S. PATENT DOCUMENTS 3,612,845 A * 10/1971 Lawlor ....................... 708/101
4,513,386 A * 4/1985 Glazer ........................ 708/255
5,267,318 A * 11/1993 Severson et al. ........... 704/270
5,832,431 A * 11/1998 Severson et al. ........... 704/258
5,961,577 A * 10/1999 Soenen et al. .............. 708/251
6,215,874 B1 * 4/2001 Borza et al. .................. 380/46
6,230,140 B1 * 5/2001 Severson et al. ........... 704/278
6,571,263 B1 * 5/2003 Nagai ............................ 708/3

OTHER PUBLICATIONS

Perry R. Cook, "Physically Informed Sonic Modeling (PhISM): Percussive Synthesis", ICMC Proceedings, 1996, pp. 228-231.

* cited by examiner

*Primary Examiner*—Martin Lerner
(74) *Attorney, Agent, or Firm*—Koppel, Patrick, Heybl & Dawson

(57) ABSTRACT

Complex sound events are created by generating multiple different kinds of simpler sounds with randomly varying repetition rates. The average repetition rate can also be variable. The values of sound parameters such as wave selection, pitch distribution, pan distribution and amplitude distribution can have random distributions, as determined by various control inputs, some of which have their own random distributions.

3 Claims, 4 Drawing Sheets

STATISTICAL SOUND EVENT MODELING SYSTEM AND METHODS

RELATED APPLICATION

This application claims the benefit of provisional patent application Ser. No. 60/242,808, filed Oct. 23, 2000.

BACKGROUND OF THE INVENTION

1. Field of the Invention

This invention relates generally to electronic and computer synthesis of sounds. More particularly, it relates to devices and methods for the synthesis of complex ambient background and foreground impact sounds that sound neither repetitive nor looped.

2. Description of the Related Art

Many computer-implemented games and simulations contain background and foreground sounds that help create a highly realistic environment. These complex sounds are often generated using some version of a wavetable synthesis algorithm. A wavetable is a table of stored sound waves, typically stored in read-only memory on a sound card chip, that are digitized samples of actual recorded sound. Complex sounds are generated by combining and modifying the stored sound waves. One of the primary techniques used by wavetable synthesizers to conserve sample memory space is the looping of sampled sound segments. For example, acoustic string instrument sounds can be modeled as attack and sustain portions, and the sustain portion in particular can be reproduced with a repeated sound sample multiplied by a continually decreasing gain factor. In order to generate and complete instrument sound, only a relatively small sample must be stored.

While wavetable synthesis techniques have proven very successful in generating musical instrument sounds, they are inadequate for synthesizing realistic game sounds, which are typically large-scale sound events made up of collections of smaller, simpler sound events. Examples of game sounds include ambient background sounds such as forest or crowd noises and complex foreground sounds such as car crashes or explosions. With standard wavetable synthesis, background sounds such as crowds sound looped, while complex impact sounds are repetitive, i.e., sound identical each time they occur. Repetitive or looped sounds begin to sound unnatural very quickly, dramatically reducing the realism conveyed by the game. Clearly, there is a need for improved techniques for generating realistic game sounds for computer simulators and games.

SUMMARY OF THE INVENTION

This invention generates more realistic complex sounds for computer simulators, games and the like by generating multiple different kinds of simpler sounds with repetition rates that vary in accordance with random time distributions. The average rate of generating the simpler sounds can also be made variable, in accordance with either user inputs or a predetermined function. Various sound parameters, such as wave selection, pitch distribution, pan distribution and amplitude distribution, can themselves be established with random value distributions that in turn are functions of inputs such as mean, standard deviation and minimum and maximum values, at least some of which have their own random distributions.

DETAILED DESCRIPTION OF THE INVENTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the present invention.

The present invention solves the above described problem by extending the wavetable concept to a statistical sound event modeler that effectively creates sounds that sound neither looped nor repetitive. Typical applications include computer games, multimedia exhibits, and music synthesis. The invention is particularly well suited for large-scale sound events that are collections of smaller, simpler sound events. For example, a car crashing into a wall is a large-scale sound event made up of individual crunch sounds, sounds of various objects falling on the ground, and different scrape sounds, among others. When generated by the method of the present invention, a car crash sound can be repeated many times while sounding different each time.

The sound generation tool of the present invention provides the following advantages:

- Low CPU usage
- Scaleable in CPU usage
- Useful for generating both complex continuous sounds and complex impact sounds
- Has a more general usefulness than a specific physical model
- Can be understood and learned easily by sound designers
- Allows sound designers to use their own wave files The techniques of the present invention may be implemented in the form of instructions stored in a memory and executed by a general purpose microprocessor present in a desktop computer, laptop computer, video arcade game, and the like. The techniques of the present invention may also be implemented in hardware, i.e., using an ASIC that is part of a computer system. The synthesized signals from the microprocessor or ASIC are output to a user using an audio sound system that is either internal to the system or part of an external sound system connected to the computer system. The hardware preferably includes conventional state-of-the-art components well known in the art. Because the primary distinguishing features of the present invention relate to the specific synthesis techniques, the following description will focus on these techniques.

Figure 1:
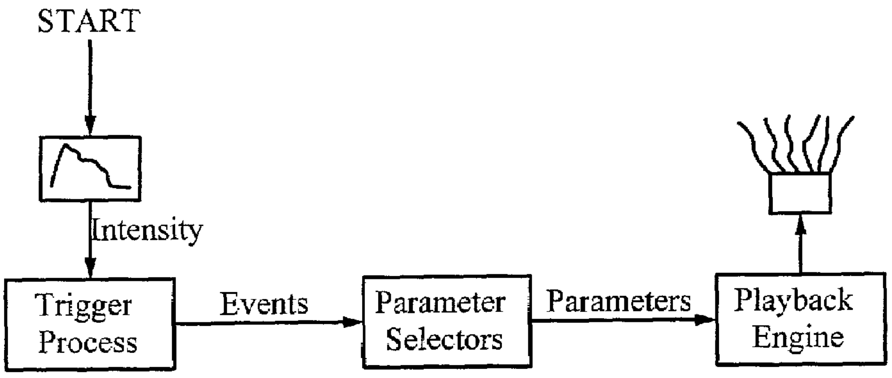
FIG. 1 is a block diagram of an event modeling system of the present invention.

FIG. 1 is a block diagram illustrating the three main components of the method. A trigger process generates a collection of events distributed through time, with the average rate of event generation controlled by one or more intensity parameters. Next, parameter selectors choose the values of various parameters according to statistical distributions that themselves have controllable input parameters. Finally, a playback engine plays waves according to the selected parameters when triggered by the trigger process.

The trigger process selects a random time lag between subsequent events that make up the large-scale or complex events. The intensity is a parameter, typically chosen by a user, that determines the average rate of generation of simple events by the trigger process. That is, the intensity is directly related to the mean of the probability density function of the time between single events. When constructing a complex sound, the user selects either a constant intensity or an intensity that changes with time; a changing intensity is referred to as an intensity envelope. For example, ambient sound such as cricket chirps are typically generated at a constant average rate. That is, while the time between individual chirps fluctuates randomly to provide a natural environment, the average time between chirps is constant over a large time period. In contrast, impact sounds such as car crashes, explosions, or dog barks are composed of individual sound events whose rate of generation is preferably not constant over the duration of the sound. For example, a car crash can begin with rapidly generated crunch sounds and gradually trail off into more slowly generated glass breaking sounds. After some experimentation, a user can determine the correct intensity envelope to achieve the desired sound. In FIG. 1, the intensity is shown as a time-varying envelope.

Figure 2:
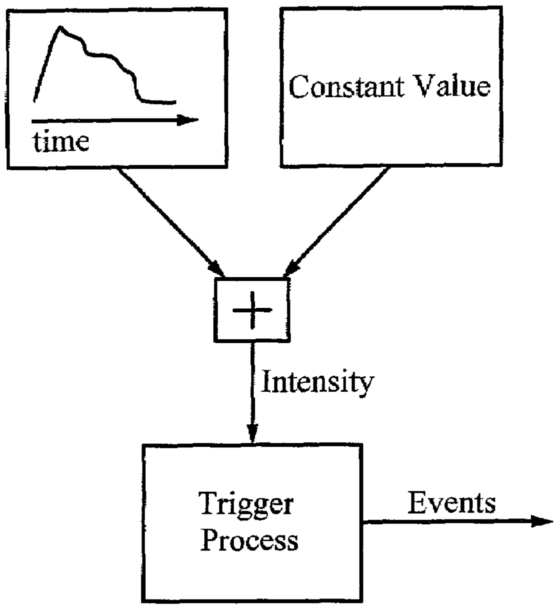
FIG. 2 is a block diagram of a trigger process that has both an intensity envelope and a constant intensity as inputs.

Combinations of intensity parameters are also possible. FIG. 2 illustrates a method in which an intensity envelope is combined with a constant intensity. The rate at which the trigger process generates events is determined by the sum of the constant intensity and the value of the intensity envelope at a particular time. Such an intensity combination is useful for background sounds that occasionally become more prominent, such as a crowd sound with occasional loud cheers or boos from the crowd. The superimposed intensity envelope can also be determined from other factors. For example, a loud crowd cheer can be triggered when a particular game event, such a goal being scored, occurs. In this case, the intensity envelope is added to the constant intensity only after the game event occurs.

Figure 3A:
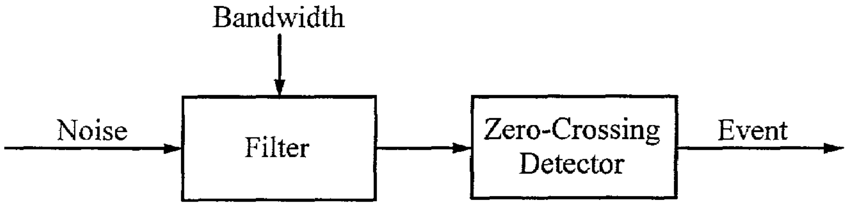
FIGS. 3A-3B are block diagrams of first and second embodiments, respectively, of the trigger process of the system of FIG. 1.

There are two main embodiments of the trigger process, both of which are characterized by a particular statistical distribution of the time between individual events. In the embodiment of FIG. 3A, the trigger process samples white noise and generates events when a strongly lowpass-filtered noise signal crosses zero in an upward-going direction. For example, the filter can be implemented as two cascaded onepole filters (or as an equivalent second-order filter):

$$F(z)=[(1+a_1)(1+a_1)]/[(1+a_1z^{-1})(1+a_1z^{-1})].$$

The rate of stochastic events is determined by the filter bandwidth, which is obtained from the user-selected (or system-selected) parameter according to the following equation:

$$a_1=-1+2\pi R_{avg}/F_s,$$

where $R_{avg}$ is the desired average rate of events (in events/second), and $F_s$ is the calculation rate (i.e., sampling rate) of the filter or filters. A smaller bandwidth decreases the average rate of event generation, i.e., increases the time between individual events. Using this method, the time distribution of event generation is described by the following normalized probability density function p(Δt) of the time between events:

$$p(\Delta t)=\alpha\Delta te^{-\beta\Delta t},$$

where α is a normalization constant. This embodiment has been shown to work well for a wide variety of complex sounds.

Figure 3B:
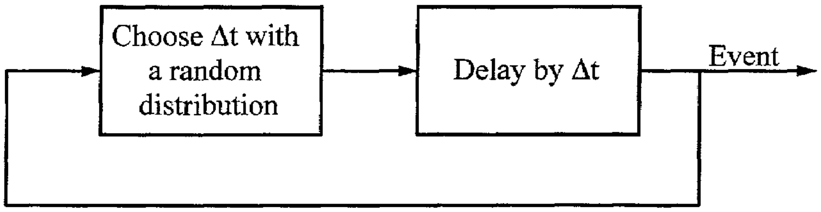

An alternative embodiment of the trigger process is illustrated in FIG. 3B. In this embodiment, event generation is based directly on predefined random distribution. After an event is generated, a random generator selects a value of the time delay, Δt, until the next event should be generated. After the selected time delay passes, a new event is generated. This new event then triggers the random generator to select a time delay for the next event according to the predefined random distribution. FIG. 3B illustrates the time delay being generated after each event. Alternatively, the entire sequence of event delays can be generated first, and then the events triggered according to the sequence.

The random generator can use any suitable random distribution. Some examples of suitable distributions can be found in Charles Dodge and Thomas a. Jerse, *Computer Music: Synthesis, Composition, and Performance*, New York: Schirmer Books, 1985, herein incorporated by reference. Csound, a programming language for software-only synthesis and processing of sound, uses a variety of distributions that may also be used in the trigger process of the present invention: linrand, trirand, exprand, bexprend, cauchy, pcauch, poisson, gauss, weibull, beta, and uniform. Alternatively, arbitrary user-defined distributions may be used. In all cases, it is necessary to determine the relationship between the user-defined intensity and some parameter of the distribution, i.e., the value of the distribution parameter that determines the resultant average rate of event generation. For known distributions, the derivation is straightforward. For arbitrary distributions, the relationship can be determined empirically by selecting a value of the distribution parameter and measuring the resulting event generation rate over a long time period. This measurement can be performed for a variety of values of the event parameter, and thus a correct parameter value corresponding to the user-selected intensity can be chosen. To select an actual event delay given a user-chosen parameter, a lookup table derived from the user-supplied probability density function is applied to the output of a uniform random generator.

Figure 4:
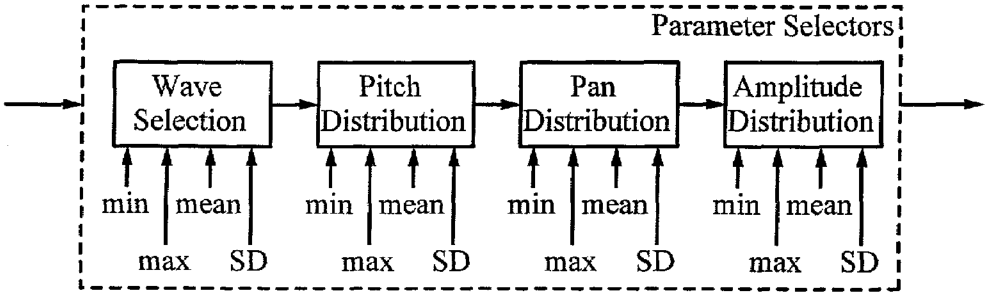
FIG. 4 is a block diagram of exemplary parameter selectors of the system of FIG. 1.

After the trigger process generates an event, the algorithm passes to the parameter selection. An exemplary embodiment of the parameter selection component of the invention is illustrated in the block diagram of FIG. 4. Four different parameters are shown; however, any number or types of parameters is within the scope of the present invention. The parameter selectors shown are wave selection, pitch distribution, pan (i.e., left-to-right sound movement) distribution, and amplitude (i.e., loudness) distribution. Each parameter selector is implemented as a Gaussian distribution with independently selectable mean and standard deviation, as well as fixed minimum and maximum values. In operation, the user selects desired values of the mean, standard deviation, minimum, and maximum for each parameter or for a subset of the parameters. Each time an event is generated by the trigger process, each parameter selector chooses a random parameter value according to its distribution. If the parameter value does not fall within the limits set by the fixed minimum and maximum, then a new value is chosen according to the same distribution until a value inside the preset limits is found. Thus each module has an effective distribution equivalent to the original distribution with the intervals outside the limits set to zero (and renormalized). The chosen parameter values are then applied to the wave chosen by the wave selection process.

Other distributions (i.e., non-Gaussian) can instead be used for the parameter selectors. For example, the same distributions as noted above for the trigger process can be applied to parameter selection. The user can select one of the multiple distributions provided or, alternatively, specify an arbitrary distribution. As with the trigger process, arbitrary user-supplied distributions can be implemented by deriving a lookup table from the probability density function and applying it to the output of a uniform random generator. A different distribution can be selected for each parameter, or the same distribution selected for all parameters.

Figure 5A:
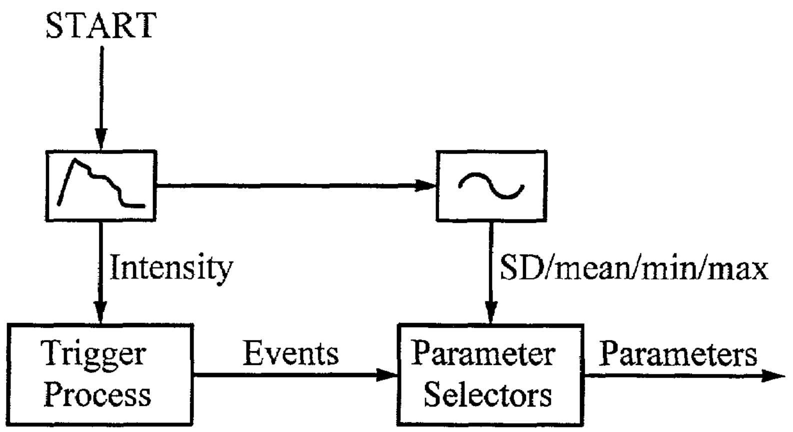
FIGS. 5A-5B are block diagrams illustrating two implementations of varying the parameter selectors with the intensity envelope.
Figure 5B:
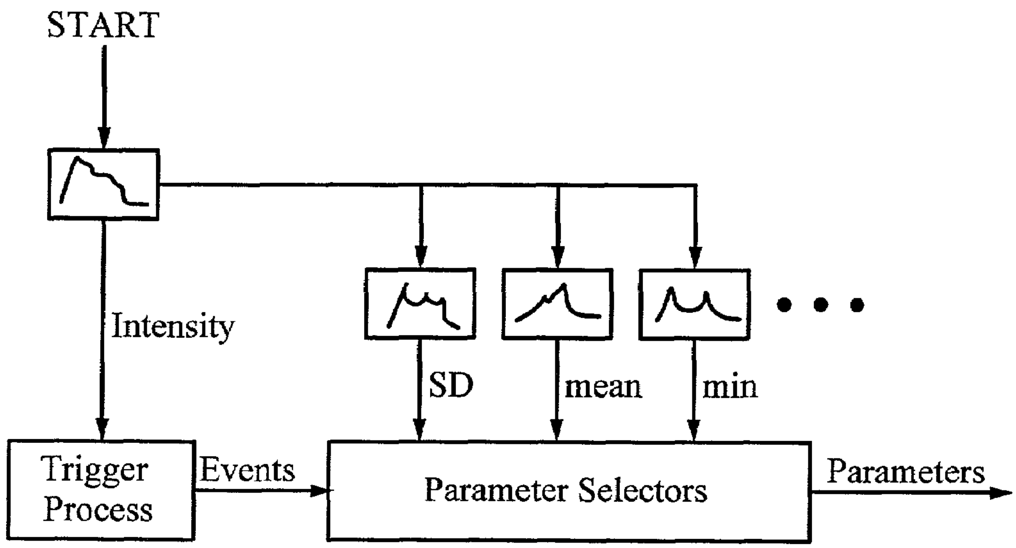

In an alternative embodiment, the inputs (mean, standard deviation, minimum, maximum) to the parameter selector distributions are varied in accordance with the variation in the trigger process intensity parameter. This is particularly useful in cases where the wave selection or pitch distribution should shift as the intensity changes. Returning to the car crash example, high-intensity events at the beginning of the car crash should be crunch sounds, while lower-intensity events at the end of the car crash should be higher-pitched glass breaking sounds. FIG. 5A illustrates one possible implementation. A simple linear transformation or lookup table is applied to the intensity envelope to obtain inputs for the parameter selectors. The intensity envelope can be used to control some or all of the mean, standard deviation, minimum, and maximum values input to the parameter selector. It can also be used to control some or all of the parameter selectors. The user can choose which inputs and which parameters depend upon the intensity envelope. The transformation applied to the intensity envelope can vary for the different inputs and parameters. Alternatively, as shown in FIG. 5B, envelope generators create separate time envelopes from the intensity envelope. These time envelopes are then applied to each parameter or each input to control the time dependence of the parameter. The parameter selector inputs can also depend upon events occurring within the game. As with the above example in which the trigger intensity changes after a goal is scored, the types of waves generated can change after an event occurs. This can be implemented by changing the minimum and maximum inputs to the wave selection process. Similarly, parameter values applied to the selected wave can also change in response to a particular game occurrence.

Finally, the playback engine generates sound according to the selected parameters. The playback engine is preferably a wavetable synthesizer such as a DLS (downloadable sound) unit generator containing samples appropriate to modeling a complex event. In the DLS unit generator, sounds from wavetables are downloaded into specific memory locations corresponding to specific program change numbers. Parameter implementation is preferably through standard controls within the playback engine. For example, in the DLS unit generator, pitch control is via a keyNum control, amplitude control is via a velocity control, and pan control is via a pan controller. Wave selection is via selection of program change, provided that each sound sample has a unique program change number. In a standard DLS synthesizer, the keyNum-to-pitch mapping is hardwired at one semitone-per-keyNum, and thus there tends to be an unintended musical sound, especially if the waves are strongly pitched. If desired, finer pitch control can be implemented using the pitchBend command.

While the present invention has been described in the context of a digital wavetable synthesizer, it will be apparent to one of ordinary skill in the art that it can be applied to any arbitrary sound synthesizer. For example, the trigger process can be in communication with an analog synthesizer. In general terms, the trigger process can trigger any sound element, not necessarily a wave, to which appropriate parameters can be applied. Thus the parameters are not restricted to the exemplary parameters described above. In fact, any relevant parameter that can be chosen stochastically for each event is within the scope of the present invention. Typically, the parameters are selected in dependence on the particular playback engine chosen. Some other examples of parameters are the filtering of waves, amount of reverberation, or three-dimensional positioning of waves.

Note that the invention does not require the application of random distributions to the trigger process and to every parameter. In some cases, it is preferable to have some of the algorithm elements be deterministic or pseudo-random. For example, rather than being triggered by the random trigger process, an event can be triggered at constant time intervals or by an occurrence within the game. The triggered event still has parameters chosen according to the random parameter distributions. Alternatively, randomly triggered events may have only some of their parameters with random distributions, while others have values determined by the user or the system.

A variety of combinations of algorithm elements, as well as combinations of algorithm elements with standard prior art elements, are possible. In some cases, it is desirable to use multiple distributions sequentially within the same event, blending smoothly from one distribution to the next. For example, a gradual shift from the sound of rain on leaves to the sound of rain on a metal roof can be implemented by morphing from a first parameter distribution to a second parameter distribution, each of which is appropriate for its respective sound. Different intensity envelopes for the trigger process can also be used sequentially or simultaneously for different complex sound events or for different components of a single complex sound event. Complex sounds can also be constructed from a combination of sounds triggered by the present invention and sounds generated by prior art techniques. For example, standard sustained background loops can be combined with non-repetitive impact sounds generated by the method of the present invention. In general, aspects of the present invention can be implemented as one component of a larger sound environment.

Figure 6:
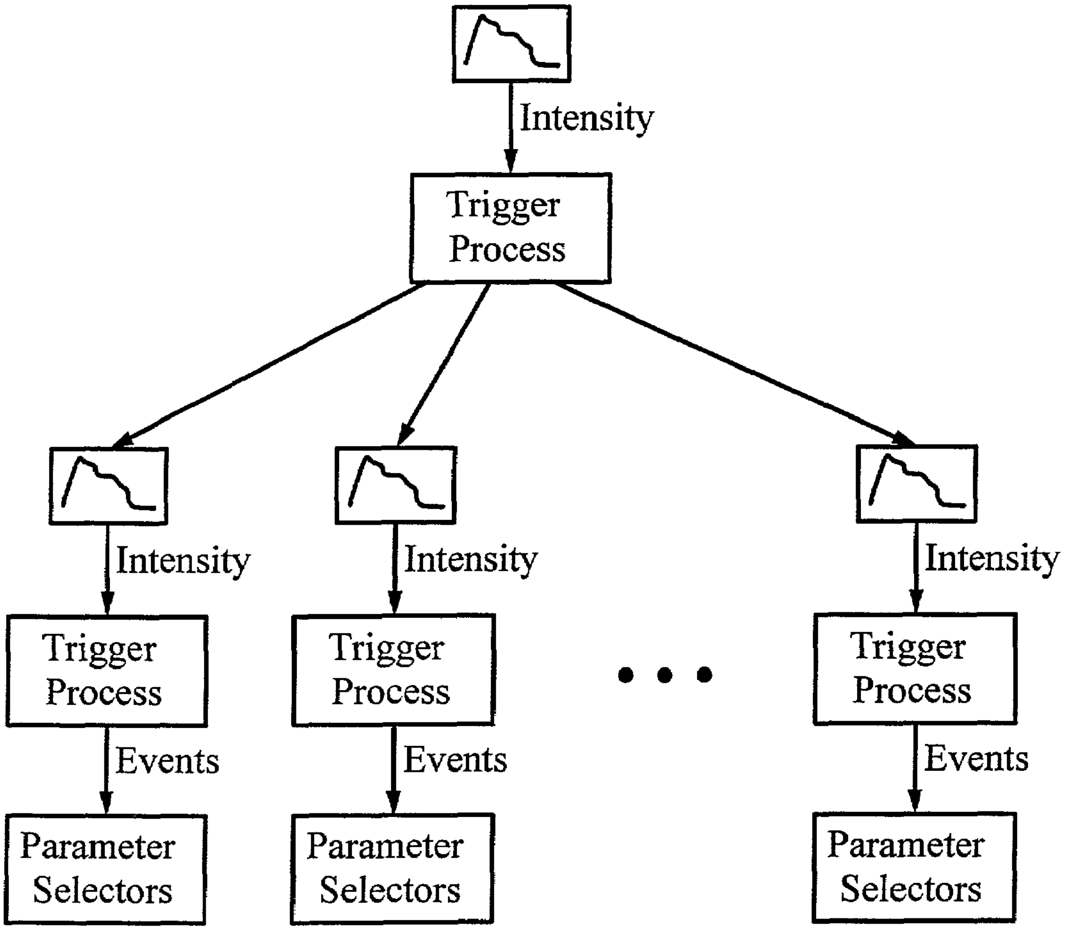
FIG. 6 is a block diagram of a nested trigger process of the present invention.

A further example is shown in FIG. 6, which illustrates a nested trigger process. Rather than trigger parameter selection for a particular event, the top-level trigger process instead triggers other trigger processes. That is, each low-level process is initiated when an event is generated by the top-level process. Of course, any number of levels of nested processes can be employed. Additionally, all of the variations of single trigger processes described above can be applied to each individual trigger process in the hierarchical system. Each low-level process can have a different intensity envelope, parameters, and parameter input values. While not shown in FIG. 6, a top-level trigger process can trigger both its own sound event and lower-level trigger processes. For example, a battle scene can have complex bomb sounds that trigger subsequent explosion sounds.

In summary, the present invention can be used to create a variety of sound types, including, but not limited to, ambient background textures, such as forest ambiance; foreground impact sounds, such as crashes and explosions; and compound textures containing background elements as well as foreground enveloped events, such as crowd sounds with cheers and boos. As described above, the present invention is particularly useful for generating statistically-triggered small component sounds that can be used either as non-looping ambient backgrounds or as components of complex impact foreground sound textures or simple one-shot sounds used to unify the base quality of the complex impact sounds.

We claim:

1. A method of synthesizing a complex sound, comprising:

generating a plurality of different kinds of simpler sound events with repetitive occurrences of each kind, establishing respective random time distributions for the occurrences of at least some of said kinds of sounds, and combining said simpler sound events into said complex sounds, wherein said random time distribution is established in accordance with white noise crossing a predetermined threshold in a predetermined direction, said white noise is low pass filtered, and the filter bandwidth determines the average rate of generating said sound event occurrences.

2. The method of claim 1, wherein said filter bandwidth is selectable.

3. The method of claim 1, wherein said white noise is filtered by a second-order filter having a frequency response characteristic F(z):

$$F(z)=[(1+\alpha_1)(1+\alpha_1)]/[(1+\alpha_1 z^{-1})(1+\alpha_1 z^{-})],$$

where $\alpha_1=-1+2\pi R_{avg}/F_s$, $R_{avg}$ is the desired average rate, and $F_s$ is the filter sampling rate.

* * * * *